:::

United States Patent
Allewaert et al.

(10) Patent No.: US 6,485,789 B1
(45) Date of Patent: Nov. 26, 2002

(54) FLUOROCHEMICAL COMPOSITION CONTAINING A CONDENSATION PRODUCT OF A FLUOROCHEMICAL POLYETHER AND A POLY-ISOCYANATE TO IMPART STAIN RELEASE PROPERTIES TO A SUBSTRATE

(75) Inventors: Kathy E. M. L. A. Allewaert, Haacht (BE); Pierre J. Vander Elst, Elewijt (BE); Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,871

(22) PCT Filed: May 14, 1998

(86) PCT No.: PCT/US98/09818

§ 371 (c)(1),
(2), (4) Date: Sep. 24, 1999

(87) PCT Pub. No.: WO98/51726

PCT Pub. Date: Nov. 19, 1998

(30) Foreign Application Priority Data

Apr. 14, 1997 (EP) ............................................ 97201389

(51) Int. Cl.$^7$ ................................................ B05D 3/02
(52) U.S. Cl. .................. 427/393.4; 252/8.62; 8/115.56; 8/115.64; 427/385.5; 427/386; 427/388.1; 427/388.4; 427/389.9; 427/391; 427/392; 427/393; 524/503; 525/56; 525/58
(58) Field of Search ............................ 524/503; 525/56, 525/58; 252/8.62; 427/386, 393, 389.9, 391, 392, 393.4, 385.5, 388.1, 388.4; 8/115.56, 115.64

(56) References Cited

U.S. PATENT DOCUMENTS

| | | |
|---|---|---|
| 2,803,615 A | 8/1957 | Ahlbrecht et al. ......... 260/29.6 |
| 2,841,573 A | 7/1958 | Ahlbrecht et al. ......... 260/79.3 |
| 3,269,961 A | 8/1966 | Bruson et al. ............... 260/2.5 |
| 3,574,791 A | 4/1971 | Sherman et al. ............ 260/884 |
| 3,920,614 A | 11/1975 | Kirimoto et al. .............. 260/63 |
| 4,046,944 A | 9/1977 | Mueller et al. ............. 428/262 |
| 4,399,077 A | 8/1983 | Vanlerberghe et al. . 260/501.13 |
| 4,508,916 A | 4/1985 | Newell et al. ............... 556/420 |
| 4,540,765 A | 9/1985 | Koemm et al. ................ 528/45 |
| 4,563,493 A | 1/1986 | Fukui et al. ................. 524/233 |
| 4,695,488 A | 9/1987 | Hisamoto et al. ........ 427/385.5 |
| 4,778,915 A | 10/1988 | Lina et al. ..................... 560/29 |
| 4,788,287 A | 11/1988 | Matsuo et al. .............. 544/196 |
| 4,792,354 A | 12/1988 | Matsuo et al. .................. 106/2 |
| 4,841,090 A | 6/1989 | Patel .......................... 558/437 |
| 4,859,754 A | 8/1989 | Maekawa et al. ........... 526/245 |
| 4,920,190 A | 4/1990 | Lina et al. ................... 526/288 |
| 5,100,954 A | 3/1992 | Itoh et al. .................... 524/805 |
| 5,107,033 A | 4/1992 | Pechold ....................... 568/615 |
| 5,276,175 A | 1/1994 | Dams et al. ................... 560/27 |
| 5,292,796 A | 3/1994 | Dams et al. ................. 524/598 |
| 5,350,795 A | 9/1994 | Smith et al. ................. 524/507 |
| 5,453,540 A | 9/1995 | Dams et al. ................... 564/96 |
| 5,491,261 A | 2/1996 | Haniff et al. ................ 562/582 |
| 5,509,939 A | 4/1996 | Kirchner ..................... 8/115.51 |
| 5,672,651 A | 9/1997 | Smith .......................... 524/590 |
| 5,841,027 A | 11/1998 | Scarffe ......................... 73/198 |

FOREIGN PATENT DOCUMENTS

| | | |
|---|---|---|
| EP | 526976 | 1/1997 |
| GB | 2 050 396 | 1/1981 |
| JP | 08-225493 | 3/1996 |
| WO | WO 94/10222 | 5/1994 |

OTHER PUBLICATIONS

X–H. Yu et al., "Synthesis and Physical Properties of Poly-(fluoralkylether) urethanes", *Journal of Applied Polymer Science*, vol. 41, 1777–1795 (1990).

Primary Examiner—Judy M. Reddick
(74) Attorney, Agent, or Firm—Kent S. Kokko

(57) ABSTRACT

The invention provides a method of treating of a substrate by contacting the substrate with a fluorochemical composition that comprises a condensation product of a di- or tri-isocyanate and at least one polyether, the polyether being obtained as the reaction product of a fluorochemical substituted epoxide. Substrates treated in accordance with the invention have good stain release properties, particularly to oil stains or tea stains, so stains can be more easily removed from the treated substrate in a laundering procedure.

26 Claims, No Drawings

FLUOROCHEMICAL COMPOSITION CONTAINING A CONDENSATION PRODUCT OF A FLUOROCHEMICAL POLYETHER AND A POLY-ISOCYANATE TO IMPART STAIN RELEASE PROPERTIES TO A SUBSTRATE

FIELD OF THE INVENTION

The present invention relates to fluorochemical compositions for the treatment of substrates, in particular fibrous substrates such as textile to impart stain release properties to those substrates.

BACKGROUND OF THE INVENTION

Certain fluorochemical compositions have been used to impart various properties, such as water and/or oil repellency, waterproofness, stain release and anti-staining to various substrates like leather, textiles and paper. For example, U.S. Pat. No. 4,563,493 describes the use of certain omega-perfluoroalkyl-1,2-epoxy-alkane copolymers as water and oil repellent treatments.

U.S. Pat. No. 4,399,077 discloses the use of certain polyoxy perfluorinated surface active oligomers in cosmetic compositions for hair to slow down the flow of sebum and the rate at which hair becomes greasy again.

EP 331307 discloses certain perfluoroalkyl polyether glycols derived from 3-perfluoroalkyl-1,2-epoxy propane. It is stated that these polyether glycols are useful for making polyurethanes in a condensation reaction with a di- or polyisocyanate.

U.S. Pat. No. 4,540,765 discloses certain fluorochemical polyurethanes that it alleges impart permanent oil and/or water repellency to inorganic and organic objects. The polyurethanes disclosed in this patent are obtained by a condensation of a fluorochemical diol and a di- or polyisocyanate.

Certain fluorochemical compositions are also used to facilitate stain release from substrates such as fabrics. Such compositions may also include various modifying additives such as softeners, stiffeners and lubricants which are added to the composition to impart desired properties to a fabric. These additives typically increase the oleophilicity of the fabric, thereby significantly increasing the fabric's tendency to accept oily stains and reducing its ability to release such stains after laundering.

An improvement to such compositions are fluorochemical treatments consisting of certain fluorinated compound and a non-fluorinated hydrophilic compound mixtures as well as treatments containing certain "chemical hybrid" fluorochemical compounds which contain fluorochemical oleophobic segments ("F") and non-fluorinated hydrophilic segments ("H"). Such improvement treatments are known to act as stain release compositions since they provide oil repellency during normal wear and inhibit wicking or diffusion of oily soils into the fabric or fiber bundles and facilitate soil release during laundering.

U.S. Pat. No. 3,574,791 discloses certain block-copolymers consisting of F and H segments and alleges that such polymers are useful as stain-release agents. The "F" segments are substantially free of hydrophilic groups whereas the "H" segments are substantially free of fluorinated aliphatic groups. The patent teaches that this segmentation of the polymer renders it "autoadaptable", i.e., a fabric treated with the polymer will perform as an oil and water repellent in an atmospheric environment and will become hydrophilic when laundered thereby facilitating stain removal. The patent contemplates various chemical linkages for connecting the "F" and "H" segments, and amongst them is a urethane linkage derived from the reaction of an alcohol and an isocyanate.

U.S. Pat. No. 4,046,944 discloses certain fluorochemical compositions containing block-copolymers that contain a fluorinated polyurethane segment linked to a hydrophilic polyethyleneoxide block via a urea linkage. The patent teaches that the fluorochemical composition can be used to impart stain release properties to a fabric.

U.S. Pat. No. 5,841,027 discloses certain fluorocarbamate soil-release agents. The urea linkage-containing alkoxypolyoxyalkylene fluorocarbamates are prepared by reacting (a) at least one polyisocyanate containing at least three isocyanate groups, with (b) at least one fluorochemical reagent containing one functional group having at least one hydrogen atom and at least two carbon atoms each of which is substituted with at least two fluorine atoms, (c) at least one hydrophilic, water-solvatable reagent containing a single functional group having at least one reactive hydrogen atom, and (d) at least one reagent containing one reactive hydrogen atom and, which on reaction with an isocyanate group, yields functionality which has abeyant chemical reactivity with fibrous substrates and then reacting the product with water. The patent discloses that reactants (b), (c) and (d) react with 55% to 95% of the isocyanate groups, and water reacts with the remainder.

JP-A-08-225493 discloses certain polymers derived from fluorine containing monomers and alleges such polymers are useful as stain releasing water and oil repellents. The monomers are fluorochemical acrylates or methacrylates that are prepared by first reacting, e.g., an alkyl ether of a polyglycol with a perfluoroalkyl epoxypropane and subsequently reacting the obtained alcohol with (meth)acryloyl chloride to obtain the fluorochemical monomer.

Despite the many fluorochemical compositions taught by the art to impart stain release properties to a substrate, there continues to be a desire for new fluorochemical compositions with improved properties. Properties like easy cleanability of natural fiber-based substrates (e.g., cotton and blends of cotton and polyester) are desired. In particular, it is especially desired to have treatments that will permit the easy removal of oil-type stains (like dirty motor oil and vegetable oil) and water-based stains (like tea and coffee) from such substrates. Also desired are fluorochemical compositions having low manufacturing cost, high storage stability, easy emulsifiability and high performance even if applied in low concentrations.

SUMMARY OF THE INVENTION

The present invention provides a method of treating of a substrate comprising the step of contacting the substrate with a fluorochemical composition which comprises a condensation product of a di- or tri-isocyanate and at least one polyether. The polyether being obtainable by reacting a fluorochemical substituted epoxide according to formula (I) with a compound of formula (II) or formula (III):

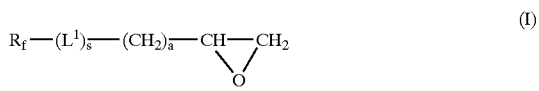

(I)

(II)

(III)

wherein:

B represents an organic residue obtained by removing the groups $HX^1$ and $HX^2$ from the compound in formula (II);

$X^1$ and $X^2$ are each independently selected from the group consisting of O, NH and S;

$L^1$ represents an organic divalent linking group;

$L^2$ represents an organic linking group having a valence of k+1;

k is an integer of 1 to 10;

$R_f$ and $R_f'$ are each independently selected from the group consisting of perfluorinated and partially fluorinated aliphatic groups;

s is 0 or 1, and a is 0 or 1, and preferably is 1.

Substrates treated in accordance with the invention have good stain release properties, particularly to oil stains or tea stains, so stains can be more easily removed from the treated substrate in a laundering procedure.

In another aspect, the invention provides certain fluorochemical compositions for use in the method, a process for the preparation of the fluorochemical compositions and the polyether used to prepare the fluorochemical compositions.

Detailed Description of the Invention

The condensation product used in the fluorochemical composition is prepared by reacting a di- or tri-isocyanate with certain polyether obtainable by reacting a fluorochemical substituted epoxide of formula (I) with a compound of according to formula (II) or (III). Mixtures of compounds of formula (I), (II) or (III) may also be used to practice the invention.

The molar ratio of the fluorochemical substituted epoxide to the compound according to formula (II) is preferably between about 2 and 50 and more preferably between about 5 and 20. The molar ratio of the fluorochemical substituted epoxide to the compound according to formula (III) is preferably between about 2 and 30 and more preferably between about 4 and 15. Preferably, the molecular weight of the polyethers obtainable from a reaction of a compound of formula (I) with a compound of formula (II) is between about 2,000 and 50,000 g/mol, more preferably is between about 6,000 g/mol and 15,000 g/mol. The molecular weight of polyethers obtainable by reaction of a compound of formula (I) with a compound of formula (III) is preferably between about 3,500 g/mol and 25,000 g/mol, more preferably is between about 4,500 g/mol and 16,000 g/mol.

The polyethers can be prepared using conventional reaction conditions well-known to those skilled in the art. Typically, the reaction of compounds according to formula (I) with compounds according to formula (II) or (III) is carried out in the presence of an acid catalyst. Acid catalysts include fluorosulfonic acid and lewis acids such as antimony pentafluoride, boron trifluoride, tin tetrachloride or aluminium trichloride. Suitable reaction temperatures are typically between about 20 and 100° C., and more preferably are between about 50 and 90° C. The reaction solvent is preferably inert and free of water and include materials like toluene and fluorinated solvents (e.g., trifluorotoluene). After the polyether is prepared, it may be desirable to remove catalyst residues and excess reagents from the reaction mixture. Generally, it is also preferred to replace any fluorinated solvent that is used with another organic solvent that readily solubilises the polyether.

Description of Preferred Compounds According to Formula (I)

The preferred compounds according to formula (I) contain fluorinated aliphatic groups ($R_f$) that are preferably stable and inert. Most preferably, such groups are saturated, non-polar, monovalent fluoroalkyl groups, and may, for example be straight chain, branched chain, or cyclic groups or combinations thereof. $R_f$ may contain heteroatoms (such as oxygen, divalent or hexavalent sulfur or nitrogen) provided they are bonded only to carbon atoms, and while it is preferably fully-fluorinated, it may contain hydrogen or chlorine atoms as substituents. However, preferably $R_f$ contains no more than one atom of either for every two carbon atoms. Typically, $R_f$ contains at least about 3 carbon atoms, preferably 3 to 14 carbon atoms and more preferably at least 6 carbon atoms. $R_f$ preferably contains about 40% to 80% fluorine by weight, and more preferably, about 50% to 78% fluorine by weight. The terminal portion of the $R_f$ radical is preferably a perfluorinated moiety, preferably containing at least about 7 fluorine atoms, e.g., $CF_3CF_2CF_2$—, $(CF_3)_2CF$—, $F_5SCF_2$—. Preferred $R_f$ groups are fully or substantially fluorinated according to the formula $C_nF_{2n+1}$, where n is 3 to 14.

Preferably, s and a in formula (I) are 1 and the organic divalent linking group, $L^1$, is present. Preferably $L^1$ is selected from the group consisting of straight chain, branched chain or cyclic alkylene, arylene, aralkylene, oxy, oxo, thio, sulfonyl, sulfoxy, amino, imino, sulfonamido, carbonamido, carbonyloxy, urethanylene and ureylene groups and combinations thereof such as sulfonamidoalkylene or carbonamidoalkylene. A particularly preferred $L^1$ is represented by the following formula:

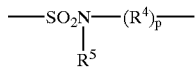

wherein:

$R^5$ represents a lower alkyl containing 1 to 4 carbon atoms, $R^4$ is selected from the group consisting of linear or branched alkylene groups that contain 1 to 4 carbon atoms, e.g. methylene, ethylene, propylene, butylene, and p is 0 or 1.

Examples of compounds according to formula (I) are as follows:

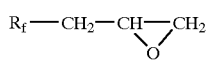

1

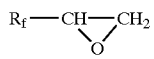

2

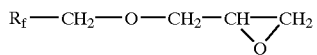

3

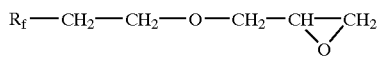

4

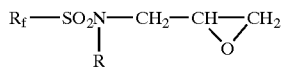

5 wherein R is a lower alkyl group having 1 to 4 carbon atoms such as methyl and ethyl.

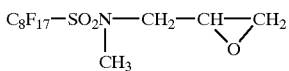

Compounds of the type 1, 2, 3 and 4 shown in the above list are disclosed in U.S. Pat. No. 4,399,077. Preferred $R_f$ groups in the above formulas are perfluorinated alkyls having 6 to 14 carbon atoms. Still further suitable compounds according to formula (I) are disclosed in U.S. Pat. No. 4,841,090.

Description of Preferred Compounds According to Formula (II)

The preferred compounds according to formula (II) contain B residues which are linear or branched alkylene groups preferably having about 2 to 4 carbon atoms, alkylene groups substituted with a partially or fully fluorinated aliphatic group optionally linked to the alkylene group through an organic divalent linking group such as a sulfonamido group, and poly(oxyalkylene) groups in which the oxyalkylene moieties preferably have about 2 to 4 carbon atoms. B also can be a divalent linking group according to the following formula:

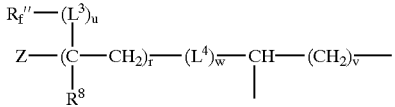

wherein:
- $R_f''$ is selected from the group consisting of perfluorinated and partially fluorinated aliphatic groups, and suitable $R_f''$ groups include the $R_f$ groups described herein;
- $L^3$ and $L^4$ each represent organic divalent linking groups which may be the same or different and include those described herein for $L^1$;
- $R^8$ is a hydrogen atom or a methyl group;
- Z represents the residue of a free radical initiator;
- r is a number of 1 to 10;
- u is 0 or 1;
- w is 0 or 1; and
- v is an integer of 1 to 4.

Preferably $L^3$ corresponds to one of the following formulas:

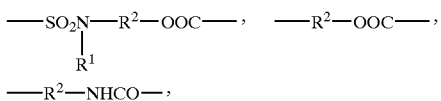

wherein:
$R^1$ represents a lower alkyl group containing 1 to 4 carbon atoms and $R^2$ is selected from the group consisting of linear and branched alkylene groups that contain 2 to 4 carbon atoms.

A particularly preferred $L^4$ group is —S—$R^3$— where $R^3$ is selected from the group consisting of linear and branched alkylene groups having 1 to 4 carbon atoms.

Compounds of formula (II) that include an organic divalent linking group according to formula (A) are typically prepared by oligomerization of a fluorinated ethylenically unsaturated compound (like an acrylate or methacrylate) in the presence of a chain transfer agent containing two functional groups selected from the group consisting of hydroxy, amino or thiol groups. Examples of suitable chain transfer agents include 3-mercapto-1,2-propanediol and 2,3-dimercaptopropanol.

Examples of fluorinated ethylenically unsaturated compounds include the general classes of fluorochemical acrylates, methacrylates, vinyl ethers, allyl compounds containing fluorinated sulfonamido groups, acrylates and methacrylates derived from fluorochemical telomer alcohols, acrylates and methacrylates derived from fluorochemical carboxylic acids, and perfluoroalkyl acrylates and methacrylates as disclosed in EP-A-526 976.

Preferred examples of fluorinated ethylenically unsaturated compounds include:

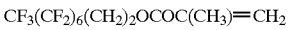
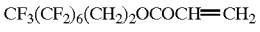
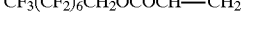
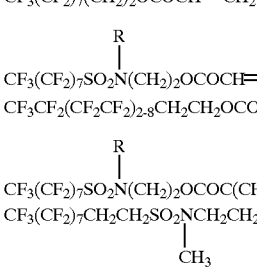

where R is a methyl, ethyl or n-butyl group.

The oligomerization is typically carried out using a free-radical initiator. Such free-radical initiators are known in the art and include azo compounds, such as azobisisobutyronitrile (AIBN) and azo-2-cyanovaleric acid and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

Examples of compounds according to formula (II) include:

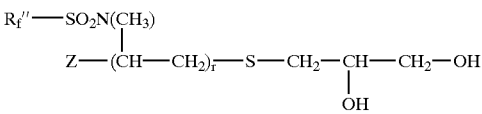

where
$R_f''$ is, for example, a perfluorinated alkyl group containing about 6 to 14 carbon atoms, and preferably about 8 carbon atoms;

alkane diols (particularly $C_2$–$C_4$ alkane diols such as ethylene glycol and 1,4-butanediol);

polyester diols, polycaprolactam diols, poly(oxyalkylene) diols, the fluorochemical diols described in U.S. Pat. No. 4,046,944;

diamines (such as $C_2$–$C_4$ diamines, ethylenediamine, 1,2-diaminopropane, 1,3-diaminopropane, 1,4-diaminobutane, 1,10-diaminodecane, 1,7 diaminoheptane, 1,6-diaminohexane, 1,12-diaminododecane, 1,9-diaminononane, 1,8-diaminooctane, 1,5-diaminopentane, isophoronediamine, Jeffamine™ ED having a molecular weight between 600 and 6000, Jeffamine™ EDR-148, piperazine, 1,8 naphtalenediamine, 1,2/1,3/1,4/phenylenediamine, 4-methyl-1,3-phenylenediamine and 4-methyl-1,2-phenylenediamine);

aminoalcohols (such as 2-aminobenzylalcohol, 4-amino-1-butanol and ethanolamine); and thiols (such as 1,2-ethanedithiol, 1,3-propanedithiol and 2-mercaptoethanol and polyoxyalkylenethiolen).

Description of Preferred Compounds According to Formula (III)

$R_f'$ in formula (III) can be perfluorinated or partially fluorinated. Examples of $R_f'$ are the same as those described herein for the $R_f$ groups. A compound according to formula (III) can have a single $R_f'$ group or multiple groups $R_f'$ and the $R_f'$ groups can be the same or different. Typically, a compound according to formula (III) has about 1 to 8 $R_f'$ groups and preferably about 2 to 6.

The linking group, $L^2$, in formula (III) has a valence equal to k+1. Examples of such groups include straight chain, branched chain and cyclic alkylene, arylene, aralkylene, oxy, oxo, thio, sulfonyl, sulfoxy, amino, imino, sulfonamido, carbonamido, carbonyloxy, urethanylene and ureylene groups and combinations thereof such as sulfonamidoalkylene or carbonamidoalkylene. A particularly preferred $L^2$ group is represented by the following formula:

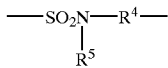

where $R^5$ is a lower alkyl group containing 1 to 4 carbon atoms and $R^4$ is selected from the group consisting of linear and branched alkylene groups that contain about 2 to 4 carbon atoms, e.g., ethylene, propylene or butylene. More preferably $L^2$ corresponds to the following formula:

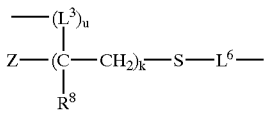

wherein:

$L^3$ represents an organic divalent linking group such as those described above for $L^1$;

$L^6$ represents an organic divalent linking group such as a linear or branched alkylene group (including alkylene groups containing a cyclic group), an arylene group (including a heteroarylene group) or an alkylarylene group;

Z represents the residue of a free radical initiator;

$R^8$ is a hydrogen atom or a methyl group;

k is a number of 1 to 10; and u is an integer of 0 or 1.

Preferably $L^3$ corresponds to one of the following formulas:

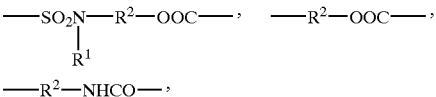

where $R^1$ is a lower alkyl group containing about 1 to 4 carbon atoms and $R^2$ is a linear or branched alkylene group that contains about 2 to 4 carbon atoms.

Compounds having an $L^2$ according to formula (B) are typically prepared by oligomerization of a fluorinated ethylenically unsaturated compound such as those described above, and in particular an acrylate or methacrylate, in the presence of a functionalized chain transfer agent containing a hydroxy, amino and thiol group. Examples of suitable chain transfer agents include 2-mercaptoethanol, 3-mercapto-2-butanol, 4-hydroxythiophenol, 1-mercapto-2-propanol, 2-mercaptopyridinol, o-, m-, and p-thiocresol and 2-mercaptoethylamine. Preferred compounds include 2-mercaptoethanol, 4-mercaptobutanol, 11-mercaptoundecanol and 2-mercaptoethylamine. The oligomerization is typically carried out using a free radical initiator as described above.

Examples of compounds according to formula (III) include:

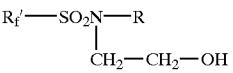

where R is a lower alkyl group that has about 1 to 4 carbon atoms such as methyl, ethyl and n-propyl;

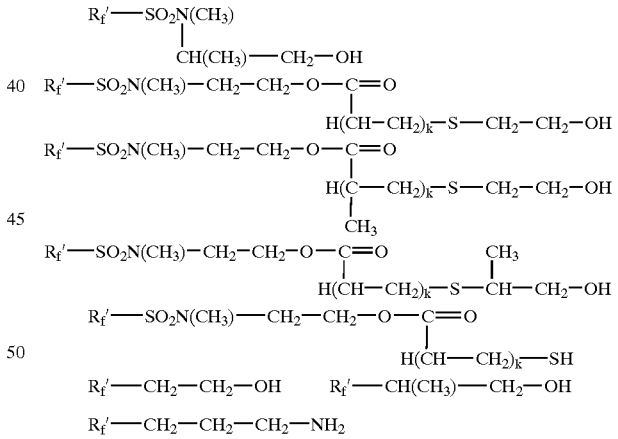

In the above compounds, $R_f'$ is preferably a perfluorinated alkyl group containing from about 6 to 14 carbon atoms, and more preferably about 8 carbon atoms, and k is as defined above.

A particularly preferred condensation product for use in the fluorochemical composition is a condensation product of the di- or tri-isocyanate, the polyether and a chain terminator selected from the group consisting of alcohol, thiol and amine compounds. A chain terminator is preferably used in an amount sufficient to react about 5% to 50% of the number of NCO groups of the polyisocyanate, more preferably from about 30% to 50%.

A preferred chain terminator is represented by the following formula (IV):

$$R^6—YH$$

wherein:
Y is selected from the group consisting of O, S and NR$^7$;
R$^6$ represents an organic radical that is free of active hydrogen atoms and capable of reacting with an isocyanate; and
R$^7$ represents a hydrogen atom or an organic radical that is free of active hydrogen atoms and capable of reacting with an isocyanate, e.g. a lower alkyl group that has 1 to 4 carbon atoms.

Examples of R$^6$ include residues obtained by removing a hydroxyl moiety from an oxime, linear or branched alkyl groups and polyether groups. Another useful chain terminator includes a fluorinated group and can be represented by the following formula (V):

$$R_f^a—L^5—$$

where R$_f^a$ is selected from the group consisting of perfluorinated or partially fluorinated aliphatic groups like those described herein for R$_f$, and L$^5$ is an organic divalent linking group. Examples of suitable L$^5$ groups include those described herein for L$^1$.

Representative examples of chain terminators include alkanols (such as methanol, ethanol, isopropanol and n-propanol); alkyl ethers of polyethylene glycols (such as polyethyleneglycol methyl ether); fluorinated monoalcohols such as:

$$R_f^a—SO_2N(R)—CH_2—CH_2—OH$$

$$R_f^a—SO_2N(R)—CH(CH_3)—CH_2—OH$$

$$R_f^a—CH_2—CH_2—OH$$

$$R_f^a—CH(CH_3)—CH_2—OH$$

(where R is a lower alkyl group that contains about 1 to 4 carbon atoms (e.g. methyl, ethyl or n-propyl) and R$_f^a$ is a perfluorinated alkyl group containing about 6 to 14 carbon atoms, and preferably about 8 carbon atoms); isocyanate blocking agents such as arylalcohols (e.g., phenol, cresols, nitrophenols, o- and p-chlorophenol, naphthols, 4-hydroxybiphenyl); C$_2$ to C$_8$ alkanone oximes (e.g. acetone oxime, butanone oxime); arylthiols (e.g., thiophenol); organic active hydrogen compounds (e.g.; diethyl malonate, acetylacetone, ethyl acetoacetate, ethyl cyanoacetate, epsilon-caprolactam); sodium bisulfite; and hydroxylamine.

A further suitable chain terminator includes a functionalized oligomer that has a functional group selected from the group consisting of hydroxy, amino and thiol groups. Such an oligomer can be prepared by free radical oligomerization of a fluorocherical monomer and/or fluorine free monomer in the presence of a functionalized chain transfer agent as described above. Examples of fluorochemical monomers are those described above. Suitable fluorine-free monomers include the general classes of ethylenic compounds capable of free-radical polymerization, such as, allyl esters (e.g., allyl acetate and allyl heptanoate); alkyl vinyl ethers and alkyl allyl ethers (e.g., cetyl vinyl ether, dodecylvinyl ether, 2-chioroethylvinyl ether and ethylvinyl ether); unsaturated acids (e.g., acrylic acid, methacrylic acid, alpha-chloro acrylic acid, crotonic acid, maleic acid, fumaric acid, itaconic acid and their anhydrides and esters such as vinyl, allyl, methyl, butyl, isobutyl, hexyl, heptyl, 2-ethyl-hexyl, cyclohexyl, lauryl, stearyl, isobornyl and alkoxy ethyl acrylates and methacrylates); alpha-beta unsaturated nitriles (e.g. acrylonitrile, methacrylonitrile, 2-chloroacrylonitrile, 2-cyanoethyl acrylate and alkyl cyanoacrylates); alpha, beta-unsaturated carboxylic acid derivatives (e.g., allyl alcohol, allyl glycolate, acrylamide, methacrylamide, n-diisopropyl acrylamide, diacetoacrylamide, N,N-diethylaminoethylmethacrylate and N-t-butylamino ethyl methacrylate); styrene and its derivatives (e.g., vinyltoluene, alpha-methylstyrene and alpha-cyanomethyl styrene); lower olefinic hydrocarbons which can contain halogen (e.g., ethylene, propylene, isobutene, 3-chloro-1-isobutene, isoprene, and allyl or vinyl halides such as vinyl and vinylidene chloride). Further suitable monomers include urethane-type (meth)acrylates such as a blocked isocyanate obtained by first reacting hydroxyethyl(meth)acrylate with a diisocyanate and subsequently reacting the obtained isocyanate containing (meth)acrylate with an isocyanate blocking agent such as butanone-oxime. The latter type of monomer can be homo-oligomerized or co-oligomerized with for example another (meth)acrylate such as butyl(meth) acrylate.

Suitable di- or tri-isocyanates include aliphatic and aromatic isocyanates and examples of such compounds include: 4,4'-methylenediphenylenediisocyanate, 4,6-di-(trifluoromethyl)-1,3-benzene diisocyanate, 2,4-toluenediisocyanate, 2,6-toluene diisocyaniate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic tri-isocyanates such as polymethylenepolyphenylisocyanate (PAPI); cyclic diisocyanates such as isophorone diisocyanate (IPDI) and dicyclohexylmethane-4,4'-diisocyanate.

Also useful are isocyanates that contain internal, isocyanate-derived moieties such as biuret-containing tri-isocyanates (e.g., DESMODUR™ N-100, available from Bayer), isocyanurate-containing tri-isocyanates (e.g., IPDI-1890 available from Huls AG, Germany), and azetedinedione-containing diisocyanates (e.g., DESMODUR™ TT available from Bayer). Also suitable are other di- or tri-isocyanates such as DESMODUR™ L and DESMODUR™ W (both available from Bayer), and tri-(4-isocyanatophenyl)-methane (available from Bayer as DESMODUR™ R).

The condensation reaction of the polyether and the isocyanate is carried out under conventional conditions well-known to those skilled in the art. Preferably the reaction is run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 to 10 percent, preferably about 0.1 to 5 percent, by weight based on the total weight of the reactants.

The condensation reaction is preferably carried out under dry conditions in a polar solvent such as ethyl acetate, acetone, methyl is,obutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

The fluorochemical composition is soluble in various organic solvents such as ethyl acetate, ethers (di-propylene glycol mono methyl ether, tetrahydrofuran, ethylene glycol ethers), ketones (acetone, methyl ethyl ketone, methyl isobutyl ketone), alcohols (methanol, ethanol, isopropyl alcohol, glycols), dimethylpyrrolidone and mixtures thereof. Accordingly, the fluorochemical composition can be used as a solution in such organic solvents or alternatively, an emulsion in water of the fluorochemical composition can be prepared according to well-known techniques. For example, a solution of the fluorochemical composition in an organic solvent, e.g., ethyl acetate, gradually can be added to a solution of an emulsifier in water with vigorous stirring. The thus obtained pre-mix may then be subjected to ultrasound treatment or high shear homogenization to obtain a milky to transparent emulsion of the fluorochemical composition in water. If desired, the organic solvent can then be removed e.g. by distillation under reduced pressure.

The fluorochemical composition of this invention can be applied using conventional application method but is peferably used a aqueous emulsion. Alternatively, it can be used as a treatment composition in solvent. An aqueous emulsion will generally contain water, an amount of the fluorochemical composition effective to provide stain release properties to the substrate treated therewith, and a surfactant in an amount effective to stabilize the emulsion. Water is preferably present in an amount of about 70 to 2000 parts by weight per 100 parts by weight of the fluorochemical composition. The surfactant is preferably present in an amount of about 1 to 25 parts by weight, preferably about 2 to 10 parts by weight, per 100 parts by weight of the fluorochemical composition. Conventional cationic, nonionic, anionic, and zwitterionic surfactants are suitable.

The amount of the treating composition applied to a substrate in accordance with this invention is chosen so that the desired stain release properties are imparted to the substrate surface. Typically, the amount of the treating composition is sufficient to provide about 0.01% to 5% by weight, and preferably about 0.05% to 2% by weight, based on the weight of the substrate, of the fluorochemical composition on the treated substrate. The amount of treating composition necessary to impart the desired stain release properties to the substrate can be determined empirically and can be increased as necessary or desired.

To the fluorochemical composition of the invention there may also be added other fluorinated products, polymers or auxiliary products such as starch, dextrin, casein, polyvinyl alcohols, cellulose and cellulose derivatives such as cellulose ethers, copolymers of (meth)acrylic acid and alkyl esters of (meth)acrylic acid, polyglycols such polyethylene glycols, sizing agents, materials to improve water and/or oil repellency, fire proofing or antistatic properties, buffering agents, fungicidal agents, optical bleaching agents, sequestering agents, mineral salts, surface-active agents, or swelling agents to promote penetration.

Particularly suitable auxiliary products for use in the fluorochemical composition include polyvinyl alcohols and non-ionic cellulose ethers. A substantial improvement relative to the release of dirty motor oil stains was noticed for many of fluorochemical compositions of the invention containing polyvinyl alcohol or a non-ionic cellulose ether, whereas the improvement was less pronounced for the release of tea or wine stains. This finding is rather surprising since the addition of other hydrophilic polymers such as polyglycols or copolymers of alkyl (meth)acrylate and (meth)acrylic acid to the fluorochemical composition did not show this improvement or even lead to a reduced stain release performance of the fluorochemical composition. Preferred polyvinyl alcohols are those having a degree of hydrolysis of at least about 65% by weight, and more preferably a degree of hydrolysis of at least about 85% by weight. Most preferably, the polyvinyl alcohol has a degree of hydrolysis between about 65 and 90% by weight.

Examples of non-ionic cellulose ether derivatives include methyl cellulose, hydroxypropyl cellulose and methylhydroxypropyl cellulose. Particularly preferred cellulose ethers are hydroxyalkyl cellulose ethers. Preferably the etherified cellulose is highly hydrophilic. Accordingly, cellulose ethers that contain large hydrophobic substituents such as the hydrophobically modified cellulose ether NEXTON™ (available from Aqualon) are not preferred for use in the fluorochemical composition of this invention.

The substrates treated by the fluorochemical composition of this invention are not especially limited and include plastic, metal, glass, fibrous materials such as textile fabrics, wood, non-wovens and paper. The fluorochemical composition is particularly useful for imparting stain release properties to a substrate that comprises natural fibers, in particular a substrate that consists of cellulose fibers or a substrate consisting of cellulose and polyester fibers. Substrates treated with a fluorochemical composition of this invention have particular good stain release properties for dirty motor oil stains and tea stains.

In order to affect treatment of a textile substrate, the substrate can be immersed in a diluted emulsion. The saturated substrate can then be run through a padder/roller to remove excess emulsion, dried and cured in an oven at a temperature and for a time sufficient to provide a cured treated substrate. This curing process is typically carried out at temperatures between about 50° C. and 190° C. depending on the particular system or application method used. In general, a temperature of about 120° C. to 170° C., preferably about 150° C. to 170° C. for a period of about 20 seconds to 10 minutes, preferably 3 to 5 minutes, is suitable. The cured treated substrate can be used as desired, e.g., incorporated or fashioned into a garment.

The invention is further illustrated by reference to the following examples without however the intention to limit the invention thereto.

EXAMPLES

Formulation and Treatment Procedure

Treatment baths were formulated containing a defined amount of the fluorochemical treatment agent. Treat were applied to the substrates by padding to provide a concentration of 0.3% or 0.6% solids (based on fabric weight and indicated as SOF (solids on fabric)) and drying the samples at 150° C. during 3 minutes. Unless otherwise specified, the substrates used in the examples were polyester/cotton 67/33 blends (PES/CO), commercially available from Arlitex, Avelgem, Belgium.

After drying, the substrates were tested for their stain release and repellency properties.

Respective data of stain release, water and oil repellency shown in the Examples and Comparative Examples were based on the following methods of measurement and evaluation criteria:

Stain Release Test

The stain release test was performed using two types of stains:

Dirty Motor Oil (DMO) obtained from General Motors Garage Houttequiet, Beveren; Belgium.

Tea: obtained by immersing a Lipton™ yellow teabag in 165 ml of water at a temperature of 65° C. for 3 minutes.

Staining of the test samples was done by putting 0.35 ml DMO or 0.5 ml tea on 10 cm×10 cm test samples. The stain was brushed into the fabric by brushing 3 times around in a plastic holder of 5 cm diameter placed around the staining liquid. The samples were equilibrated at room temperature for 24 hours after which the degree of staining was evaluated by measuring the difference in reflection of a stained versus an unstained sample of the substrate, using a Minolta Color Meter (Lamp D65). An average of 3 measurements was done for each stain, providing a $\Delta L_{IN}$ value.

The stained samples were pinned on a PES/CO ballast of 3 kg and laundered in a Miele washing machine type W 832. A commercial detergent (20 g/kg Clax 100, available from Diversy Lever) was added, and the substrate was washed at 70° C. using the main washing program, followed by four rinse cycles and centrifuging. The samples were dried in a tumble dryer and ironed at 150° C. for 15 seconds. Unstained samples were treated the same way. The samples were measured with the Minolta meter providing a $\Delta L_{LD70° C.}$ value, compared to an unstained sample. The less negative the $\Delta L_{LD70° C.}$, compared to $\Delta L_{IN}$ the better the stain release properties. %$\Delta\Delta L$ was calculated according to the formula: %$\Delta\Delta L=(\Delta L_{IN}-\Delta L_{LD70° C.}/\Delta L_{IN})\times 100$ and indicates the percentage of stain removed during the laundering process. The higher the value, the better the stain removal.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid which does not penetrate or wet the substrate surface after 15 seconds exposure. Substrates which were penetrated by or were resistant only to a 100% water test liquid (0% isopropyl alcohol), which is the least penetrating test liquid, were given a rating of 0. Substrates resistant to 100% isopropyl alcohol test liquid (0% water), which is the most penetrating test liquid, were given a rating of 10. Other intermediate ratings were calculated by dividing the percent isopropyl alcohol in the test liquid by 10. For example, a treated substrate resistant to a 70%/30% isopropyl alcohol/water blend test liquid, but not to an 80%/20% blend test liquid, would be given a rating of 7.

Oil Repellency (OR)

The oil repellency of a substrate was measured by the American Association of Textile Chemicsta and Colorists (AATCC) Standard Test Method No. 118-1983, which test was based on the resistance of a substrate to penetration by oils of varying surface tensions. Treated substrates resistant only to Nujol®, mineral oil (the least penetrating of the test oils) were given a rating of 1, whereas treated substrates resistant to heptane (the most penetrating of the test liquids) were given a rating of 8. Other intermediate values were determined by use of other pure oils or mixture of oils, as shown in the following table.

| Standard Test Liquids | |
|---|---|
| AATCC Oil Repellency Rating Number | Compositions |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Abbreviations

The following abbreviations and trade names were used in the examples:
AIBN: azo)bis)isobutyronitrile
RSH: 2-mercaptoethanol
EtOAc: ethylaceate
MEFOSG: 1-(N-methyl perfluorooctyl sulfonamido)-2,3-epoxy propane
MEFOSE: N-methyl perfluorooctyl sulfonamido ethyl alcohol
MEFOSEA: N-methyl perfluorooctyl sulfonamido ethyl acrylate
MEFOSEDIOL: N-methyl perfluorooctyl sulfonamido propane diol
MEFOSEA-OL: Hydroxy terminated fluorochemical oligomer, prepared from MEFOSEA/2-mercaptoethanol in a 4/1 ratio, according to the following procedure: a round bottom flask equipped with two reflux condensors, a stirrer, a temperature control, a nitrogen inlet and a vacuum outlet was charged with 2.4 moles MEFOSEA and 987 g EtOAc. The mixture was heated at 40° C. until all fluorochemical monomer was dissolved. 0.6 moles 2-mercaptoethanol and 0.15% AIBN were then added. The reaction mixture was gradually heated to 80° C. The reaction was run under a nitrogen atmosphere at 80° C. for 16 hours, after which more than 95% conversion was obtained.
MEFOSEADIOL: hydroxy terminated fluorochemical oligomer, prepared from MEFOSEA/3-mercapto-1,2-propanediol 4/1 using the method described for MEFOSEA-OL
DEG: diethyleneglycol
$PEG^{200-8000}$: polyethyleneglycol, the superscript number is indicative of Mw, available from Huls, Germany
$MPEG^{750-5000}$: polyethylene glycol methylether, the superscript number is indicative of Mw, available from Inspec, Belgium
IPA: isopropyl alcohol
TEA: triethylamine
DESW: dicyclohexyl methane-4,4'-diisocyanate, available from Bayer (Germany) as DESMODUR™ W.
DESN: aliphatic polyisocyanate, available from Bayer (Germany) as DESMODUR™ N,
DESL: aromatic triisocyanate, available from Bayer (Germany) as DESMODUR™ L,
Ar T50 or Arquad T-50: tallow trimethyl ammoniumchloride, available from Akzo, Littleborough, UK
Atp E5721 or Atpol E5721: alkylethoxylate, available from ICI, Wilton, UK
Rew IM/OA or Rewopon IM OA : imidazoline type surfactant, available from Rewo, Germany
$BF_3.OEt_2$: boron trifluoride diethyletherate MEHQ: methylhydroquinone
HOEMA: 2-hydroxyethylmethacrylate
IPDI: isophorone diisocyanate
BA: butylacrylate
BO: 2-butanone oxime
HTO: hydroxy terminated oligomer {HOEMA/IPDI/2BO}/BA/SCH$_2$CH$_2$OH in a ratio of 1/3/1, used in fluorochemical compounds FC-6 and FC-10 (Table 2) and prepared in two steps:
  a) synthesis of HOEMA/IPDI/2BO (1/1/1) A round bottom flask equipped with a mechanical stirrer, a temperature control, addition funnel and a nitrogen inlet and outlet, was charged with 111 g IPDI, 65 g HOEMA, 200 g EtOAc, 0.1 g phenotiazin, 0.1 g MEHQ and 0.2 g dibutyl tin dilaurate. The reaction mixture was slowly heated to about 50° C. A solution of 44 g 2-butanone oxime, dissolved in 20 g EtOAc was slowly added over a period of 1 hour. Then the reaction mixture was stirred at 72° C. for 6 hours. IR analysis indicated that all isocyanate groups had reacted.
  b) synthesis of {HOEMA/IPDI/2BO}/BA/SCH$_2$CH$_2$OH in a 1/3/1 ratio A round bottom flask equipped with a mechanical stirrer, a temperature control, and a nitrogen inlet and outlet, was charged with 43.94 g compound prepared according to step a, 38.45 g BA, 7.8 g RSH and 90 g EtOAc. After degassing and nitrogen purging, 0.23 g (0.25%) AIBN were added. The reaction mixture was stirred at 72° C. for 16 hours. Another 0.1 g AIBN was then added and the reaction was continued at 72° C. for 4 hours.

PVA: polyvinylalcohol
IPA: isopropylalcohol
Airvol™ 165: polyvinylalcohol available from Air Products
Mowiol™: polyvinylalcohol with various weight average molecular weights as indicated in the following table, available from Hoechst

| Mowiol ™ type | Degree of Hydrolysis | Molecular Weight |
| --- | --- | --- |
| Mowiol ™ 3-83 | 83 | 14000 |
| Mowiol ™ 3-98 | 98 | 16000 |
| Mowiol ™ 10-74 | 74 | 20000 |
| Mowiol ™ 4-98 | 98 | 27000 |
| Mowiol ™ 5-88 | 88 | 35000 |
| Mowiol ™ 10-98 | 98 | 61000 |
| Mowiol ™ 15-79 | 79 | 100000 |
| Mowiol ™ 20-98 | 98 | 125000 |
| Mowiol ™ 18-88 | 88 | 130000 |
| Mowiol ™ 28-98 | 98 | 145000 |
| Mowiol ™ 26-88 | 88 | 160000 |
| Mowiol ™ 40-88 | 88 | 205000 |

Polyviol™: polyvinylalcohol, of various grades according to the following table, available from Wacker-Chemie.

| Polyviol ™ type | Degree of Hydrolysis (mol %) |
| --- | --- |
| Polyviol ™ V03/240 | 75–79 |
| Polyviol ™ V03/180 | 82–85 |
| Polyviol ™ V03/140 | 86–89 |
| Polyviol ™ G04/20 | 97.5–99.5 |
| Polyviol ™ M05/290 | 69–73 |
| Polyviol ™ M05/140 | 86–89 |
| Polyviol ™ W25/190 | 81–84 |
| Polyviol ™ W25/100 | 90–93 |
| Polyviol ™ W45/450 | 42–50 |

Culminal™ MHPC: Methyl hydroxypropyl cellulose, available from Aqualon Klucel™ M: Hydroxypropyl cellulose, available from Aqualon.

All parts, ratios, percentages etc. in the following examples and the rest of the specification are by weight unless otherwise noted.

A. Synthesis of Fluorochemical Polyethers

Several fluorochemical polyethers, indicated as intermediates (INT) in Table 1, were prepared according to the general procedure described for the synthesis of MEFOSG/PEG$^{1000}$ 10/1 (indicated as INT-2 in Table 1).

A round bottom flask equipped with a condensor and a temperature control was charged with 56.9 g MEFOSG, 10 g PEG$^{1000}$ and 100 g trifluorotoluene. The reaction mixture was heated at 60° C. When the contents of the flask was dissolved, 0.3 ml BF$_3$.OEt$_2$ was added. An exothermic reaction took place, raising the temperature of the reaction mixture to 90° C. The reaction was run under nitrogen at 100° C. for 16 hours. The trifluorotoluene was distilled off and replaced by 66.9 g ethylacetate.

TABLE 1

Composition of Fluorochemical Polyethers (INT)

| Intermediate | Composition of Fluorochemical Polyethers | Ratio |
| --- | --- | --- |
| INT-1 | MEFOSG/DEG | 20/1 |
| INT-2 | MEFOSG/PEG$^{1000}$ | 10/1 |
| INT-3 | MEFOSG/PEG$^{1000}$ | 20/1 |
| INT-4 | MEFOSG/PEG$^{2000}$ | 10/1 |
| INT-5 | MEFOSG/PEG$^{4000}$ | 10/1 |
| INT-6 | MEFOSG/PEG$^{4000}$ | 20/1 |
| INT-7 | MEFOSG/PEG$^{8000}$ | 10/1 |
| INT-8 | MEFOSG/MEFOSEDIOL | 20/1 |
| INT-9 | MEFOSG/MEFOSEDIOL | 40/1 |
| INT-10 | MEFOSG/MEFOSEADIOL | 8/1 |
| INT-11 | MEFOSG/MEFOSEADIOL | 20/1 |
| INT-12 | MEFOSG/MEFOSEA-OL | 4/1 |
| INT-13 | MEFOSG/MEFOSEA-OL | 15/1 |
| INT-14 | MEFOSG/MEFOSEA-OL | 20/1 |

B. Condensation of Isocyanate with the Fluorochemical Polyether

The fluorochemical polyethers, prepared under step A, were further reacted with isocyanate derivatives, chain extenders and blocking agents according to the general procedure outlined for the synthesis of DESW/INT-2/MEFOSE 3/2/2.

A round bottom flask, equipped with a condensor and temperature control was charged with 1.1 g MEFOSE, 0.79 g Desmodur, W, 15.38 g INT-2 and 40 g EtOAc. The reaction mixture was heated at 60° C. until the contents of the flask were dissolved. Then catalyst was added (TEA/Sn-octanoate, available from Witco as Formez C-2) and the reaction was run at 75° C. for 16 hours after which all isocyanate groups were reacted.

C. Emulsification of Condensation Product 10 g (solids) of condensation product prepared under step B, were added to 57 g water containing emulsifier as indicated in Table 2. The mixture was homogenized with an ultrasonic probe (Branson 250 sonifier) after which the organic solvent was removed by evaporation. A 15% or 20% emulsion was obtained.

Following the above described procedures, the fluorochemical compounds described in Table 2 were prepared.

TABLE 2

Composition of Fluorochemical Compounds (FC)

| FC | Composition | Ratio | Emulsifier System | % Emulsifier | % Solids |
|---|---|---|---|---|---|
| FC-1 | PAPI/INT-1/2BO | 2/1/4 | Ar T50/Atp E5721 | 1.4/3 | 15 |
| FC-2 | PAPI/INT-1/MEFOSEA-OL/2BO | 2/1/1/3 | Ar T50/Atp E5721 | 1.4/3 | 15 |
| FC-3 | PAPI/INT-2/MEFOSE/2BO | 3/2/2/3 | Ar T50/Atp E5721 | 1.4/3 | 20 |
| FC-4 | PAPI/INT-2/MEFOSEA-OL/2BO | 3/2/2/3 | Ar T50/Atp E5721 | 1.4/3 | 20 |
| FC-5 | PAPI/INT-3/2BO | 3/2/5 | Ar T50/Atp E5721 | 1.4/3 | 20 |
| FC-6 | DESN/INT-2/MEFOSE/HTO | 3/2/2/3 | Ar T50/Atp E5721 | 1.5/3 | 15 |
| FC-7 | DESL/INT-2/MEFOSE/2BO | 3/2/2/3 | Ar T50/Atp E5721 | 1.5/3 | 15 |
| FC-8 | PAPI/INT-4/MEFOSE/2BO | 3/2/2/3 | Ar T50/Atp E5721 | 1.5/3 | 15 |
| FC-9 | DESW/INT-4/MEFOSE | 3/2/2 | Ar T50/Atp E5721 | 1.5/3 | 15 |
| FC-10 | DESW/INT-4/HTO | 3/2/2 | Ar T50/Atp E5721 | 1.5/3 | 15 |
| FC-11 | DESW/INT-4/MPEG$^{750}$ | 3/2/2 | Ar T50/Atp E5721 | 1.5/3 | 15 |
| FC-12 | PAPI/INT-4/MPEG$^{2000}$/2BO | 3/2/2/3 | Ar T50/Atp E5721 | 1.5/3 | 15 |
| FC-13 | PAPI/INT-2/MPEG$^{750}$/2BO | 3/2/2/3 | Ar T50/Atp E5721 | 1.5/3 | 15 |
| FC-14 | DESW/INT-5/MEFOSE | 3/2/2 | Ar T50 | 3 | 15 |
| FC-15 | DESW/INT-5/MPEG$^{2000}$ | 3/2/2 | Ar T50 | 3 | 15 |
| FC-16 | DESW(INT-7/MEFOSE | 3/2/2 | Ar T50 | 3 | 15 |
| FC-17 | PAPI/INT-5/MPEG$^{2000}$/2BO | 3/2/2/3 | Ar T50 | 3 | 15 |
| FC-18 | PAPI/INT-5/MPEG$^{5000}$/2BO | 3/2/2/3 | Ar T50 | 3 | 15 |
| FC-19 | PAPI/INT-7/MPEG$^{5000}$/2BO | 3/2/2/3 | Ar T50 | 3 | 15 |
| FC-20 | DESW/INT-6/MEFOSE | 3/2/2 | Ar T50 | 3 | 15 |
| FC-21 | PAPI/INT-6/MPEG$^{2000}$/2BO | 3/2/2/3 | Ar T50 | 3 | 15 |
| FC-22 | PAPI/INT-8/2BO | 3/2/5 | Ar T50/Atp E5721 | 1.4/3 | 15 |
| FC-23 | PAPI/INT-8/PEG$^{1000}$/2BO | 3/0.5/1.5/5 | Ar T50/Atp E5721 | 1.4/3 | 20 |
| FC-24 | PAPI/INT-9/2BO | 3/2/5 | Ar T50/Atp E5721 | 1.5/4 | 15 |
| FC-25 | PAPI/INT-10/2BO | 2/1/4 | Rew IM/OA/Atp E5721 | 3/2 | 15 |
| FC-26 | PAPI/INT-11/2BO | 2/1/4 | Ar T50/Atp E5721 | 1.4/3 | 15 |
| FC-27 | PAPI/INT-11/2BO | 3/2/5 | Ar T50/Atp E5721 | 1.4/3 | 15 |
| FC-28 | PAPI/INT-11/PEG$^{2000}$/2BO | 3/0.5/1.5/5 | Ar T50/Atp E5721 | 1.4/3 | 20 |
| FC-29 | PAPI/MPEG$^{750}$/INT-13/2BO | 1/0.5/1/15 | Ar T50/Atp E5721 | 1.4/3 | 20 |
| FC-30 | PAPI/INT-12/PEG$^{1000}$/2BO | 3/2/2/3 | Ar T50/Atp E5721 | 1.4/3 | 20 |
| FC-31 | PAPI/INT-12/2BO | 1/1.5/1.5 | Ar T50/Atp E5721 | 1.4/3 | 20 |
| FC-32 | PAPI/INT-14/2BO | 1/2/4 | Ar T50/Atp E5721 | 1.4/3 | 15 |

Examples 1 to 34 and Comparative Example C-1

In Examples 1 to 34 fluorochemical compounds prepared and emulsified according to the general procedure described above were used to treat PES/CO substrates at a level so as to result in 0.3 or 0.6% SOF. After treatment, the substrates were dried at 150° C. for 3 minutes. The treated PES/CO substrates were stained with dirty motor oil and tested for their stain release and repellency properties. Comparative Example C-1 was made using untreated PES/CO. The results are shown in Table 3.

TABLE 3

Stain Release Properties for DMO Stain

| Ex No | Fluoro-chemical Compound | % SOF | Initial Performance OR | Initial Performance WR | Stain Release Color Measurement $\Delta L_{IN}$ | Stain Release Color Measurement $\Delta L_{LD\ 70°\ C.}$ | % $\Delta\Delta L$ |
|---|---|---|---|---|---|---|---|
| 1 | FC-3 | 0.3 | 5 | 2 | −18.27 | −7.1 | 61 |
| 2 | FC-3 | 0.6 | 5 | 3 | −17.97 | −3.79 | 79 |
| 3 | FC-6 | 0.3 | 6 | 7 | −17.82 | −7.49 | 58 |
| 4 | FC-6 | 0.6 | 6 | 8 | −18.53 | −6.91 | 63 |
| 5 | FC-7 | 0.3 | 5 | 3 | −18.44 | −8.09 | 56 |
| 6 | FC-7 | 0.6 | 5 | 4 | −18.31 | −6.37 | 65 |
| 7 | FC-8 | 0.3 | 5 | 1 | −18.14 | −6.34 | 61 |
| 8 | FC-8 | 0.6 | 6 | 2 | −18.2 | −3.72 | 80 |
| 9 | FC-9 | 0.3 | 6 | 0 | −17.93 | −2.53 | 86 |
| 10 | FC-9 | 0.6 | 6 | 0 | −18.03 | −3.49 | 81 |
| 11 | FC-10 | 0.3 | 5 | 0 | −18.16 | −4.7 | 74 |
| 12 | FC-10 | 0.6 | 6 | 0 | −18.44 | −6.4 | 65 |
| 13 | FC-11 | 0.3 | 5 | 0 | −19 | −5.87 | 69 |
| 14 | FC-11 | 0.6 | 5 | 0 | −18.85 | −6.27 | 67 |
| 15 | FC-12 | 0.3 | 4 | 0 | −18.67 | −4.25 | 77 |
| 16 | FC-12 | 0.6 | 5 | 0 | −18.58 | −2.93 | 84 |
| 17 | FC-13 | 0.3 | 5 | 1 | −17.99 | −6.65 | 63 |
| 18 | FC-13 | 0.6 | 5 | 3 | −17.97 | −3.79 | 79 |
| 19 | FC-14 | 0.3 | 4 | 0 | −18.01 | −8.25 | 54 |
| 20 | FC-14 | 0.6 | 5 | 0 | −18.26 | −7.83 | 57 |
| 21 | FC-15 | 0.3 | 4 | 0 | −17.65 | −7.99 | 55 |
| 22 | FC-15 | 0.6 | 5 | 0 | −17.34 | −6.88 | 60 |
| 23 | FC-16 | 0.3 | 3 | 0 | −17.07 | −6.42 | 62 |
| 24 | FC-16 | 0.6 | 4 | 0 | −17.54 | −6.24 | 64 |
| 25 | FC-17 | 0.3 | 5 | 0 | −18.62 | −8.13 | 56 |
| 26 | FC-17 | 0.6 | 5 | 0 | −19.06 | −6.724 | 65 |
| 27 | FC-18 | 0.3 | 4 | 0 | −17.47 | −8.22 | 53 |
| 28 | FC-18 | 0.6 | 4 | 0 | −17.4 | −8.26 | 53 |
| 29 | FC-19 | 0.3 | 2 | 0 | −18.84 | −7.19 | 62 |
| 30 | FC-19 | 0.6 | 3 | 0 | −17.25 | −6.5 | 62 |
| 31 | FC-20 | 0.3 | 5 | 1 | −18.26 | −9.29 | 49 |
| 32 | FC-20 | 0.6 | 5 | 1 | −18.07 | −6.36 | 65 |
| 33 | FC-21 | 0.3 | 4 | 0 | −18.28 | −6.49 | 64 |
| 34 | FC-21 | 0.6 | 5 | 1 | −17.85 | −2.77 | 84 |
| C-1 | — | — | 0 | 0 | −15.32 | −10.18 | 34 |

The data presented in Table 3 shows that the fluorocherical compounds according to the invention showed good stain release properties. High oil repellency values were obtained together with low water repellency. The best release properties towards oily stains such as DMO, were obtained with fluorochemical compounds with incorporated ethylene oxide chains having lower molecular weight. Both aliphatic and aromatic isocyanates could be used for providing fluorochemical compounds with good stain release.

Examples 35 to 68 and Comparative Example C-2

In Examples 35 to 68 PES/CO substrates treated with the fluorochemical compounds according to the invention were stained with tea. Comparative Example C-2 was made using untreated PES/CO fabric. The results of stain release and oil and water repellency are given in Table 3.

TABLE 3

Stain Release for Tea Stain

| Ex No | Fluoro-chemical Compound | % SOF | Initial Performance OR | WR | Stain Release Color Measurement $\Delta L_{IN}$ | $\Delta L_{LD\ 70°\ C.}$ | % $\Delta\Delta L$ |
|---|---|---|---|---|---|---|---|
| 35 | FC-3 | 0.3 | 5 | 2 | −2.49 | −0.99 | 60 |
| 36 | FC-3 | 0.6 | 5 | 3 | −2.6 | −1.15 | 56 |
| 37 | FC-6 | 0.3 | 6 | 7 | −2.29 | −1.22 | 47 |
| 38 | FC-6 | 0.6 | 6 | 8 | −2.35 | −1.32 | 44 |
| 39 | FC-7 | 0.3 | 5 | 3 | −1.72 | −0.97 | 44 |
| 40 | FC-7 | 0.6 | 5 | 4 | −1.67 | −0.79 | 53 |
| 41 | FC-8 | 0.3 | 5 | 1 | −2.53 | −1 | 60 |
| 42 | FC-8 | 0.6 | 6 | 2 | −2.25 | −0.94 | 58 |
| 43 | FC-9 | 0.3 | 6 | 0 | −2.84 | −1.03 | 64 |
| 44 | FC-9 | 0.6 | 6 | 0 | −2.58 | −0.84 | 67 |
| 45 | FC-10 | 0.3 | 5 | 0 | −2.98 | −1.33 | 55 |
| 46 | FC-10 | 0.6 | 6 | 0 | −3.08 | −1.18 | 62 |
| 47 | FC-11 | 0.3 | 5 | 0 | −3.17 | −1.02 | 68 |
| 48 | FC-11 | 0.6 | 5 | 0 | −3.67 | −1.03 | 72 |
| 49 | FC-12 | 0.3 | 4 | 0 | −3.1 | −1.03 | 67 |
| 50 | FC-12 | 0.6 | 5 | 0 | −3.55 | −0.99 | 72 |
| 51 | FC-13 | 0.3 | 5 | 1 | −2.23 | −0.97 | 57 |
| 52 | FC-13 | 0.6 | 5 | 3 | −2.6 | −1.1 | 58 |
| 53 | FC-14 | 0.3 | 4 | 0 | −3.56 | −1.39 | 61 |
| 54 | FC-14 | 0.6 | 5 | 0 | −3.26 | −1.01 | 69 |
| 55 | FC-15 | 0.3 | 4 | 0 | −3.58 | −1.18 | 67 |
| 56 | FC-15 | 0.6 | 5 | 0 | −3.49 | −0.75 | 79 |
| 57 | FC-16 | 0.3 | 3 | 0 | −3.35 | −1.02 | 70 |
| 58 | FC-16 | 0.6 | 4 | 0 | −3.34 | −0.83 | 75 |
| 59 | FC-17 | 0.3 | 5 | 0 | −3.38 | −1.14 | 66 |
| 60 | FC-17 | 0.6 | 5 | 0 | −3.64 | −1.01 | 72 |
| 61 | FC-18 | 0.3 | 4 | 0 | −3.53 | −1.35 | 62 |
| 62 | FC-18 | 0.6 | 4 | 0 | −3.39 | −1.18 | 65 |
| 63 | FC-19 | 0.3 | 2 | 0 | −3.37 | −1.07 | 68 |
| 64 | FC-19 | 0.6 | 3 | 0 | −3.14 | −0.99 | 68 |
| 55 | FC-20 | 0.3 | 5 | 1 | −2.2 | −0.66 | 70 |
| 66 | FC-20 | 0.6 | 5 | 1 | −2.3 | −0.77 | 67 |
| 67 | FC-21 | 0.3 | 4 | 0 | −2.2 | −0.72 | 67 |
| 68 | FC-21 | 0.6 | 5 | 1 | −2.55 | −0.74 | 71 |
| C-2 | — | — | 0 | 0 | −2.62 | −1.22 | 53 |

The results indicate that the fluorochemical compositions of the invention also exhibit good stain release properties for water based stains such as tea stains. For these stains, the presence of more or larger polyethyleneoxide groups in the fluorochemical compounds of the compositions seem to provide better stain release performance.

Examples 69 to 77 and Comparative Example C-3

In Examples 69 to 77, PES/CO substrate was treated with fluorochemical compound FC-9 (Example 69) or with a 50/50 blend of FC-9 with various polyvinyl alcohols (Examples 70 to 77). The substrate was treated in such a way as to have 0.6% SOF fluorochemical compound and 0.6% SOF polyvinyl alcohol (when used). Comparative Example C-3 was made using untreated PES/CO. The samples were tested for their repellency properties. All Examples had a value of 6 for oil repellency and no water repellency; Comparative Example C-3 had no oil and no water repellency. The treated and untreated substrates were stained with DMO and tested for their stain release properties. The results are given in Table 4.

TABLE 4

Stain Release Properties for DMO Stains

| Ex No | FC Compound | PVA | $\Delta L_{IN}$ | Stain Release Color Measurement* $\Delta L_{LD70°\ C.}$ | % $\Delta\Delta L$ |
|---|---|---|---|---|---|
| 69 | FC-9 | — | −58.8 | −7.1 | 88 |
| 70 | FC-9 | Mowiol ™ 3-83 | −59.8 | −1.49 | 98 |
| 71 | FC-9 | Mowiol ™ 3-98 | −59.6 | −5.86 | 90 |
| 72 | FC-9 | Mowiol ™ 10-74 | −59.5 | −2.48 | 96 |
| 73 | FC-9 | Mowiol ™ 5-88 | −58.2 | −4.0 | 93 |
| 74 | FC-9 | Mowiol ™ 15-79 | −59.8 | −1.83 | 97 |
| 75 | FC-9 | Mowiol ™ 18-88 | −59.6 | −2.58 | 96 |
| 76 | FC-9 | Mowiol ™ 26-88 | −59.2 | −2.93 | 95 |
| 77 | FC-9 | Mowiol ™ 40-88 | −59.4 | −3.96 | 93 |
| C-3 | — | — | −45.0 | −21.9 | 51 |

The data shows that good stain release properties were observed for the PES/CO treated with the fluorochemical compositions of the invention. A further improvement was noticed when the treating composition also contained a polyvinyl alcohol. For many of the treated samples, little or no visible stain remained after laundering.

Examples 78 to 83

In Examples 78 to 83, PES/CO substrate was treated with fluorochemical compounds FC-12, FC-15 and FC-16 (Examples 78, 80 and 82 respectively) or with a 50/50 blend of the fluorochemical compound and polyvinyl alcohol Mowiol™ 3-83 (Examples 79, 81 and 83 respectively). The substrate was treated in such a way as to have 0.6% SOF fluorochemical and 0.6% SOF polyvinyl alcohol. The treated substrates were stained with DMO and tested for their stain release and repellency properties. The results are reported in Table 5.

TABLE 5

Stain Release for DMO Stains

| Ex No | FC Compound | PVA | Initial Performance OR | Stain Release Color Measurement $\Delta L_{IN}$ | $\Delta L_{LD\ 70°\ C.}$ | % $\Delta\Delta L$ |
|---|---|---|---|---|---|---|
| 78 | FC-12 | — | 5 | −17.2 | −7.1 | 59 |
| 79 | FC-12 | Mowiol ™ 3-83 | 5 | −16.6 | −4.9 | 70 |
| 80 | FC-15 | — | 4 | −16.7 | −6.3 | 62 |
| 81 | FC-15 | Mowiol ™ 3-83 | 5 | −16.4 | −5.2 | 68 |
| 82 | FC-16 | — | 4 | −16.4 | −5.8 | 65 |
| 83 | FC-16 | Mowiol ™ 3-83 | 4 | −16.5 | −5.0 | 70 |

The data in Table 5 shows that similar improvements in stain release performance are obtained with other fluorochemical compounds of this invention when they are combined with a polyvinyl alcohol.

Examples 84 to 95 and Comparative Examples C4 and C-5

In Examples 84 to 95, PES/CO substrates were treated with fluorochemical compound FC-9 at various add-on levels with or without the addition of Mowiol™ 3-83, as shown in Table 6. Comparative Example C-4 was made using untreated substrate and Comparative Example C-5 was made with PES/CO substrate treated with Mowiol™ 3-83 (1% SOF). The treated and untreated substrates were stained with DMO and tested for their stain release and oil and water repellency properties. The results are reported in Table 6.

TABLE 6

| Ex No | % FC-9 | % Mowiol™ 3-83 | Initial Performance OR | Color Measurement | | |
|---|---|---|---|---|---|---|
| | | | | $\Delta L_{IN}$ | $\Delta L_{LD\,70°\,C.}$ | % $\Delta\Delta L$ |
| 84 | 0.6 | — | 6 | −17.3 | −3.5 | 80 |
| 85 | 0.6 | 1.0 | 6 | −16.6 | −0.7 | 96 |
| 86 | 0.6 | 0.6 | 6 | −16.2 | −0.7 | 96 |
| 87 | 0.6 | 0.4 | 6 | −17.0 | −1.6 | 90 |
| 88 | 0.4 | — | 5 | −16.7 | −4.4 | 74 |
| 89 | 0.4 | 1.0 | 6 | −16.6 | −0.5 | 97 |
| 90 | 0.4 | 0.6 | 6 | −17.1 | −0.8 | 95 |
| 91 | 0.4 | 0.4 | 6 | −16.7 | −0.8 | 95 |
| 92 | 0.3 | — | 5 | −17.4 | −7.1 | 59 |
| 93 | 0.3 | 1.0 | 6 | −16.5 | −0.4 | 98 |
| 94 | 0.3 | 0.6 | 6 | −16.7 | −0.7 | 96 |
| 95 | 0.3 | 0.4 | 6 | −16.7 | −1.0 | 94 |
| C-4 | — | — | 0 | −14.2 | −8.5 | 40 |
| C-5 | — | 1.0 | 0 | −15.1 | −5.8 | 62 |

These results demonstrate that addition of polyvinyl alcohol to the fluorochemical treating composition improves the stain release performance. Moreover as can be seen, part of the fluorochemical compound can be replaced by polyvinyl alcohol while maintaining excellent stain release properties and without sacrificing the oil repellent properties.

Examples 96 to 105 and Comparative Example C-6

In Examples 96 to 105, PES/CO substrate was treated with fluorocherical compound FC-9 (Example 96) or with a 50/50 blend of FC-9 with various Polyviol brand polyvinyl alcohols (Examples 97 to 105). The substrate was treated in such a way as to have 0.6% SOF fluorocherical compound and 0.6% SOF polyvinyl alcohol. Comparative Example C-6 was made using untreated PES/CO. The treated and untreated substrates were stained with DMO and tested for their stain release and repellency properties. The results are given in Table 7.

TABLE 7

| Ex No. | PVA Polyviol™ | Initial Performance OR | Stain Release Color Measurement* | | |
|---|---|---|---|---|---|
| | | | $\Delta L_{IN}$ | $\Delta L_{LD\,70°\,C.}$ | % $\Delta\Delta L$ |
| 96 | — | 6 | −58.8 | −7.1 | 88 |
| 97 | V03/240 | 6 | −56.7 | −1.9 | 97 |
| 98 | V03/180 | 6 | −54.0 | −1.4 | 97 |
| 99 | V03/140 | 6 | −57.8 | −1.5 | 97 |
| 100 | G04/20 | 6 | −56.1 | −5.7 | 90 |
| 101 | M05/290 | 6 | −58.8 | −2.4 | 96 |
| 102 | M05/140 | 6 | −58.0 | −2.3 | 96 |
| 103 | W25/190 | 6 | −58.5 | −1.5 | 97 |
| 104 | W25/100 | 6 | −57.3 | −2.2 | 96 |
| 105 | W45/450** | 6 | −58.6 | −8.1 | 86 |
| C-6 | — | 0 | −45.0 | −21.9 | 51 |

Notes:
*lens opening of Minolta colorimeter was set at 53 mm
**Polyviol™ W45/450 was not soluble in water and had to be dissolved in IPA/Water 1/1

Similarly to the results in Table 4, the data in Table 7 confirms that the addition of polyvinyl alcohol improves the stain release properties of the fluorochemical compositions of this invention.

Examples 106 to 117 and Comparative Examples C-7 and C-8

In Examples 106 to 117, PES/CO substrate was treated with fluorochemical compound FC-9 or with a 50/50 blend of FC-9 with polyvinyl alcohol, as shown in Table 8. The substrate was treated in such a way as to have 0.6% SOF fluorochemical and 0.6% SOF polyvinyl alcohol. Comparative Examples C-7 and C-8 were made using untreated PES/CO. The treated and untreated substrates were strained with tea or wine and tested for their stain release and repellency properties. All samples had an oil repellency of 6 and no water repellency. Comparative Examples C-7 and C-8 had no oil and no water repellency. The results of stain release are given in Table 8.

TABLE 8

| Ex No | PVA | Stain Release Performance* | | |
|---|---|---|---|---|
| | | $\Delta L_{IN}$ | $\Delta L_{LD\,70°\,C.}$ | % $\Delta\Delta L$ |
| Stain: TEA | | | | |
| 106 | — | −7.0 | −2.9 | 60 |
| 107 | Mowiol™ 3-83 | −6.9 | −2.1 | 69 |
| 108 | Mowiol™ 5-88 | −6.4 | −2.1 | 68 |
| 109 | Airvol™ 165 | −7.0 | −2.6 | 63 |
| 110 | Polyviol™ V03/180 | −6.7 | −2.2 | 67 |
| 111 | Polyviol™ W25/190 | −6.6 | −1.8 | 73 |
| C-7 | — | −6.3 | −3.4 | 46 |
| Stain: WINE | | | | |
| 112 | — | −16.4 | −3.0 | 81 |
| 113 | Mowiol™ 3-83 | −14.4 | −2.4 | 84 |
| 114 | Mowiol™ 5-88 | −16.4 | −2.8 | 83 |
| 115 | Airvol™ 165 | −15.4 | −2.8 | 82 |
| 116 | Polyviol™ V03/180 | −13.6 | −1.9 | 86 |
| 117 | Polyviol™ W25/190 | −13.6 | −1.9 | 86 |
| C-8 | — | −13.4 | −3.5 | 74 |

Examples 118 to 123

In Examples 118 to 123, PES/CO substrate was treated with fluorochemical compounds FC-12, FC-15 or FC-16 (Examples 118, 120 and 122) or with a 50/50 blend of the fluorochemical compound with Mowiol™ 3-83 (Examples 119, 121 and 123), as given in Table 9. The substrate was treated in such a way as to have 0.6% SOF fluorochemical or 0.6% SOF fluorocherical and 0.6% SOF polyvinyl alcohol. The treated substrates were stained with tea and tested for their stain release and repellency properties (WR 0). The results are given in Table 9.

TABLE 9

| Ex No | Fluorochemical Compound | Polyvinyl alcohol | Oil Repellency | Stain Release Color Measurement | | |
|---|---|---|---|---|---|---|
| | | | | $\Delta L_{IN}$ | $\Delta L_{LD70°\,C.}$ | % $\Delta\Delta L$ |
| 118 | FC-12 | — | 5 | −3.1 | −1.3 | 56 |
| 119 | FC-12 | Mowiol ™ 3-83 | 5 | −3.0 | −1.0 | 65 |
| 120 | FC-15 | — | 4 | −3.0 | −1.1 | 61 |
| 121 | FC-15 | Mowiol ™ 3-83 | 5 | −2.6 | −0.9 | 68 |
| 122 | FC-16 | — | 4 | −2.6 | −1.1 | 60 |
| 123 | FC-16 | Mowiol ™ 3-83 | 4 | −2.5 | −1.0 | 61 |

Although not as pronounced as the improvement in the release of dirty motor oil stains, the data in Table 9 and Table 8 show that the addition of polyvinyl alcohol also improves the release of aqueous based stains such as wine and tea.

Examples 124 to 145

In Examples 124 to 145, PES/CO substrate was treated with fluorochemical compounds FC-9, FC-12, FC-15 or FC-16 or with a 50/50 blend of the fluorochemical compound with Culminal™ MHPC 50 or Klucel™ M, as given in Table 10. The substrate was treated in such a way as to have 0.6% SOF fluorochemical or 0.6% SOF fluorochemical and 0.6% SOF cellulose derivative. The treated substrates were stained with tea or DMO and tested for their stain release and repellency properties (all samples had a WR of 0, except Examples 129 and 140 (WR 1)). The results are given in Table 10.

TABLE 10

| Ex No | Fluoro-chemical Compound | Cellulose Derivative | Oil Repel-lency | Stain Release Color Measurement | | |
|---|---|---|---|---|---|---|
| | | | | $\Delta L_{IN}$ | $\Delta L_{LD70°\,C.}$ | % $\Delta\Delta L$ |
| Stain: TEA | | | | | | |
| 124 | FC-9 | — | — | −2.8 | −1.4 | 51 |
| 125 | FC-9 | Culminal ™ | 6 | −2.8 | −1.3 | 56 |
| 126 | FC-9 | Klucel ™ | 5 | −3.4 | −1.4 | 60 |
| 127 | FC-12 | — | — | −3.1 | −1.3 | 56 |
| 128 | FC-12 | Culminal ™ | 5 | −2.6 | −1.1 | 58 |
| 129 | FC-12 | Klucel ™ | 5 | −2.9 | −1.1 | 61 |
| 130 | FC-15 | — | — | −3.0 | −1.1 | 61 |
| 131 | FC-15 | Culminal ™ | 5 | −2.8 | −1.0 | 64 |
| 132 | FC-15 | Klucel ™ | 4 | −3.6 | −1.2 | 67 |
| 133 | FC-16 | — | — | −2.6 | −1.1 | 60 |
| 134 | FC-16 | Klucel ™ | 4 | −2.9 | −1.0 | 66 |
| Stain: DMO | | | | | | |
| 135 | FC-9 | — | — | −16.3 | −1.9 | 88 |
| 136 | FC-9 | Culminal ™ | 6 | −16.2 | −0.5 | 97 |
| 137 | FC-9 | Klucel ™ | 5 | −16.5 | −1.2 | 93 |
| 138 | FC-12 | — | — | −17.2 | −7.1 | 59 |
| 139 | FC-12 | Culminal ™ | 5 | −16.2 | −2.3 | 86 |
| 140 | FC-12 | Klucel ™ | 5 | −17.3 | −4.6 | 73 |
| 141 | FC-15 | — | — | −16.7 | −6.3 | 62 |
| 142 | FC-15 | Culminal ™ | 5 | −16.6 | −5.6 | 66 |
| 143 | FC-15 | Klucel ™ | 4 | −16.4 | −4.8 | 70 |
| 144 | FC-16 | — | — | −16.4 | −5.8 | 65 |
| 145 | FC-16 | Klucel ™ | 4 | −16.8 | −5.4 | 68 |

This Table shows that also the addition of a non-ionic cellulose ether improves the stain release performance of the fluorochemical composition in particular with regard to the release of dirty motor oil stains.

Examples 146 to 161

In Examples 146 to 161, PES/CO substrate was treated with fluorochemical compounds FC-9 or FC-15 or with a 50/50 blend of the fluorochemical compound with polyethyleneglycol of various molecular weights, as given in Table 11. The fluorochemical compound and the polyethyleneglycol (when used) were applied at 0.6% SOF each. The treated substrates were stained with DMO or tea and tested for their stain release properties. The results are given in Table 11.

TABLE 11

| Ex No | FC | PEG | Stain Release Color Measurement* | | |
|---|---|---|---|---|---|
| | | | $\Delta L_{IN}$ | $\Delta L_{LD70°\,C.}$ | % $\Delta\Delta L$ |
| Stain: DMO | | | | | |
| 146 | FC-9 | — | 58.4 | 6.9 | 88 |
| 147 | — | PEG 200 | 56.4 | 5.1 | 91 |
| 148 | — | PEG 1000 | 56.4 | 13.3 | 76 |
| 149 | — | PEG 2000 | 58.1 | 19.0 | 67 |
| 150 | — | PEG 4000 | 58.4 | 22.4 | 62 |
| 151 | FC-15 | — | 48.4 | 19.0 | 61 |
| 152 | — | PEG 200 | 49.0 | 16.2 | 67 |
| 153 | — | PEG 1000 | 48.7 | 17.1 | 65 |
| Stain: TEA | | | | | |
| 154 | FC-9 | — | 7.0 | 3.9 | 44 |
| 155 | — | PEG 200 | 6.8 | 3.9 | 43 |
| 156 | — | PEG 1000 | 6.6 | 3.8 | 42 |
| 157 | — | PEG 2000 | 6.3 | 4.0 | 37 |
| 158 | — | PEG 4000 | 6.0 | 3.6 | 40 |
| 159 | FC-15 | — | 7.3 | 3.8 | 48 |
| 160 | — | PEG 200 | 6.8 | 3.3 | 52 |
| 161 | — | PEG 1000 | 6.3 | 3.4 | 46 |

Note:
*lens opening of Minolta colorimeter was set at 53 mm

The data in Table 11 shows that the addition of polyethylene glycol to the fluorochemical composition did not improve the stain release performance of the composition substantially, and in many of tested samples lead to a decreased performance relative to a fluorochemical composition without the addition of polyethylene glycol.

What is claimed is:

1. A method of treatment of a fibrous substrate comprising the step of contacting said substrate with a fluorochemical composition comprising a condensation product of a di- or tri-isocyanate and at least one polyether provided by reacting a fluorochemical substituted epoxide of formula (I) with a compound of formula (II) or (III):

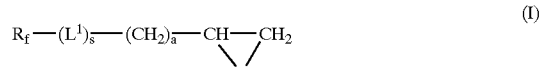

(I)

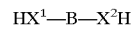

(II)

(III)

wherein
- B represents the organic residue obtained by removing the groups $HX^1$ and $HX^2$ from the compound of formula (II);
- $X^1$ and $X^2$ each independently represents O, NH and S;
- $L^1$ represents an organic divalent linking group;
- $L^2$ represents an organic linking group having a valency of k+1;
- k represents an integer of 1 to 10;
- $R_f$ and $R_f'$ independently represent a fully or partially fluorinated aliphatic; and
- s and a are each 1.

2. A method according to claim 1 wherein said condensation product is a condensation product of a di- or tri-isocyanate, said polyether, and a chain terminator selected from the group consisting of an alcohol, a thiol and an amine.

3. A method according to claim 2 wherein said chain terminator corresponds to formula (IV):

wherein
- Y represents O, S and $NR^7$;
- $R^6$ represents an organic radical free of active hydrogen; and
- $R^7$ represents hydrogen or an organic radical being free of active hydrogen groups.

4. A method according to claim 3 wherein $R^6$ is selected from the group consisting of a residue obtained by removing a hydroxyl group from an oxime, a linear or branched alkyl and a group corresponding to formula (V):

wherein $R_f^a$ represents a fully- or partially-fluorinated aliphatic group and $L^5$ represents an organic divalent linking group.

5. A method according to claim 1, wherein B represents an organic divalent linking group selected from the group consisting of an alkylene, a poly(oxyalkylene) with an oxyalkylene group having 2 to 4 carbon atoms and a divalent linking group according to formula (A):

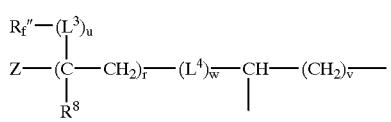

wherein:
- $R_f''$ represents a fluorinated aliphatic group that is perfluorinated or partially fluorinated;
- $L^3$ and $L^4$ independently represent an organic divalent linking group;
- $R^8$ represents hydrogen or a methyl group;
- Z represents the residue of a free radical initiator;
- r represents a number of 1 to 10;
- u and w independently represent an integer of 0 or 1; and
- v represents an integer of 1, 2, 3 or 4.

6. A method according to claim 5 wherein B represents an alkylene group substituted with a fully- or partially-fluorinated aliphatic group that is optionally linked to said alkylene group via an organic divalent linking group.

7. A method according to claim 1 wherein $L^2$ in formula (III) corresponds to formula (B):

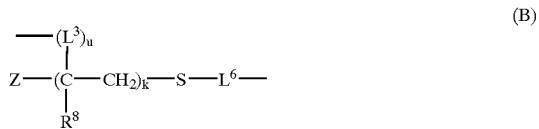

wherein:
- $L^3$ represents an organic divalent linking group;
- $L^6$ represents an organic divalent linking group;
- $R^8$ represents hydrogen or a methyl group;
- Z represents the residue of a free radical initiator;
- k represents a value of 1 to 10;
- and u independently represents an integer of 0 to 1.

8. A method according to claim 5 wherein u is 1; $L^3$ corresponds to one of the following formulas:

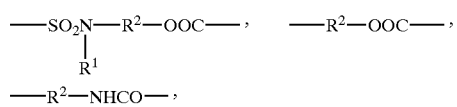

wherein
- $R^1$ represents a lower alkyl group containing 1 to 4 carbon atoms and $R^2$ represents a linear or branched alkylene group containing 2, 3 or 4 carbon atoms;
- w is 1 and L4 corresponds to the following formula (C):

wherein $R^3$ represents a linear or branched alkylene group having 1, 2, 3 or 4 carbon atoms.

9. A method according to claim 5, wherein one or more of $R_f$, $R_f'$ or $R_f''$ is a fluorinated aliphatic group containing at least 6 carbon atoms.

10. A method according to claim 5, wherein $R_f$, $R_f'$ or $R_f''$ is a perfluorinated aliphatic group.

11. A method according to claim 1, wherein $L^1$ corresponds to the following formula:

wherein $R^5$ represents a lower alkyl group containing 1 to 4 carbon atoms, $R^4$ represents a linear or branched alkylene group containing 1, 2, 3 or 4 carbon atoms, and p represents 0 or 1.

12. A method according to claim 1, wherein said substrate comprises natural fibers.

13. A method according to claim 1, wherein said substrate consists of cellulose fibers or polyester fibers.

14. A method according to claim 1, wherein said substrate is textile or paper.

15. A method according to claim 1, wherein said fluorochemical composition further comprises a polymer selected from the group consisting of polyvinyl alcohols and non-ionic cellulose ethers.

16. A method according to claim 15 wherein said polymer is polyvinyl alcohol having a degree of hydrolysis between 65% by weight and 90% by weight.

17. A fluorochemical composition comprising a condensation product of a di- or tri-isocyanate, and at least one polyether provided by reacting a fluorochemical substituted epoxide of formula (I) with a compound of formula (II) or (III):

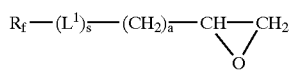 (I)

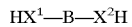 (II)

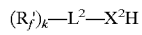 (III)

wherein:
B represents the organic residue obtained by removing the groups $HX^1$ and $HX^2$ from the compound in formula (II);
$X^1$ and $X^2$ each independently represent O, NH and S;
$L^1$ represents an organic divalent linking group;
$L^2$ represents an organic linking group having a valency of k+1;
k represents an integer of 1 to 10;
$R_f$ and $R_f'$ independently represent a fully- or partially-fluorinated aliphatic group;
s and a are independently 0 or 1; and
a chain terminator selected from the group consisting of an alcohol, a thiol and an amine.

18. A fluorochemical composition according to claim 17, wherein said chain terminator corresponds to formula (IV):

 (IV)

wherein
Y represents O, S and $NR^7$;
$R^6$ represents an organic radical free of active hydrogen groups; and
$R^7$ represents hydrogen or an organic radical free of active hydrogen group.

19. A fluorochemical composition according to claim 18, wherein $R^6$ is selected from the group consisting of a residue obtained by removing a hydroxyl group from an oxime, a linear or branched alkyl, and a group corresponding to formula (V):

 (V)

wherein $R_f^a$ represents a fully- or partially-fluorinated aliphatic group, and $L^5$ represents an organic divalent linking group.

20. A fluorochemical composition according to claim 17, wherein B represents an organic divalent linking group selected from the group consisting of an alkylene, a poly(oxyalkylene) with an oxyalkylene group having 2 to 4 carbon atoms and a divalent linking group according to formula (A):

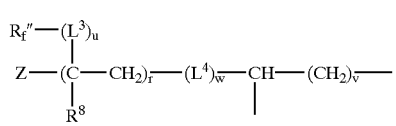 (A)

wherein:
$R_f''$ represents a fluorinated aliphatic group that is perfluorinated or partially fluorinated;

$L^3$ and $L^4$ independently represent an organic divalent linking group;
$R^8$ represents hydrogen or a methyl group;
Z represents the residue of a free radical initiator;
r represents a value of 1 to 10:
u and w independently represent an integer of 0 or 1; and
v represents an integer of 1, 2, 3 or 4.

21. A fluorochemical composition according to claim 20, wherein B represents an alkylene group substituted with a partially fluorinated or perfluorinated aliphatic group that is optionally linked to said alkylene group via an organic divalent linking group.

22. A fluorochemical composition according to claim 17, wherein $L^2$ in formula (III) corresponds to formula (B):

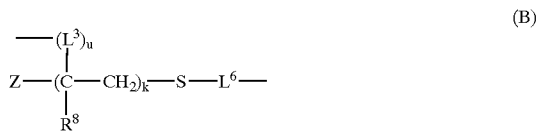 (B)

wherein:
$L^3$ represents an organic divalent linking group;
$L^6$ represents an organic divalent linking group;
k represents a value of 1 to 10;
Z represents the residue of a free radical initiator;
$R^8$ represents hydrogen or a methyl group;
and u represents an integer of 0 or 1.

23. A fluorochemical composition according to claim 20, wherein u is 1; $L^3$ corresponds to one of the following formulas:

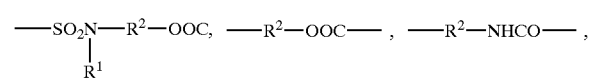

wherein
$R^1$ represents a lower alkyl group containing 1 to 4 carbon atoms and $R^2$ represents a linear or branched alkylene group containing 2, 3 or 4 carbon atoms;
w is 1 and $L^4$ corresponds to the following formula (C):

 (C)

wherein $R^3$ represents a linear or branched alkylene group having 1, 2, 3 or 4 carbon atoms.

24. A fluorochemical composition according to claim 17, wherein said fluorochemical composition further comprises a polymer selected from the group consisting of polyvinyl alcohols and non-ionic cellulose ethers.

25. A fluorochemical composition according to claim 24 wherein said fluorochemical composition further comprises a polyvinyl alcohol having a degree of hydrolysis between 65% by weight and 90% by weight.

26. The method of claim 1 wherein $L^1$ is selected from the group consisting of straight chain, branched chain or cyclic alkylene, arylene, aralkylene, oxy, oxo, thio, sulfonyl. sulfoxy, amino, imino, sulfonamido, carbonamido, carbonyloxy, urethanylene and ureylene groups and combinations thereof.

* * * * *

UNITED STATES PATENT AND TRADEMARK OFFICE
CERTIFICATE OF CORRECTION

PATENT NO. : 6,485,789 B1
DATED : November 26, 2002
INVENTOR(S) : Allewaert, Kathy E. M. L. A.

It is certified that error appears in the above-identified patent and that said Letters Patent is hereby corrected as shown below:

Column 3,
Line 14, delete "," and insert in place thereof -- ; --.

Column 4,
Line 4, after "thereof" insert -- . --.

Column 6,
Line 16, delete "$CF_3(CF_2)_4CH_2OCO(CH_3)=CH_2$" and insert in place thereof -- $CF_3(CF_2)_4CH_2OCOC(CH_3)=CH_2$ --.

Column 9,
Line 22, delete "$R_f$" and insert in place thereof -- $R_f^a$ --.
Line 61, delete "fluorocherical" and insert in place thereof -- fluorochemical --.

Column 10,
Line 2, delete "2-chioroethylvinyl" and insert in place thereof -- 2-chloroethylvinyl --.
Line 31, delete "diisocyaniate" and insert in place thereof -- diisocyanate --.

Column 11,
Line 32, delete "method" and insert in place thereof -- methods --.
Line 32-33, delete "peferably" and insert in place thereof -- preferably --.
Line 33, delete "a" and insert in place thereof -- as an --.

Column 12,
Line 54, delete "Treat" and insert in place thereof -- Treatments --.
Line 55, after "the" insert -- test --.

Column 13,
Line 58, delete "Chemicsta" and insert in place thereof -- Chemists --.
Line 66, delete "mixture" and insert in place thereof -- mixtures --.

Column 14,
Line 18, delete "azo)bis)isobutyronitrile" and insert in place thereof -- azo(bis) isobutyronitrile --.
Line 20, delete "ethylaceate" and insert in place thereof -- ethylacetate --.

Column 17,
Table 2, Row 16, Column 2, delete "DESW(INT-7/MEFOSE" and insert in place thereof -- DESW/INT-7/MEFOSE --.

UNITED STATES PATENT AND TRADEMARK OFFICE
CERTIFICATE OF CORRECTION

PATENT NO.   : 6,485,789 B1
DATED        : November 26, 2002
INVENTOR(S)  : Allewaert, Kathy E. M. L. A.

It is certified that error appears in the above-identified patent and that said Letters Patent is hereby corrected as shown below:

Column 18,
Line 61-62, delete "flouorocherical" and insert in place thereof -- fluorochemical --.

Column 20,
Line 23, Below Table 4, insert -- Note *the lens opening of the Minolta colorimeter was set at 53 mm instead of 18 mm. --.

Column 21,
Line 12, insert -- Stain Release -- before "Color".
Lines 37 and 40, delete "flouorocherical" and insert in place thereof -- fluorochemical --.
Line 62, after "*" insert -- : --.

Column 21,
Line 63, after "**" insert -- : --.

Column 22,
Line 18, delete "strained" and insert in place thereof -- stained --.
Line 49, below Table 8, insert -- Note: *Lens opening of Minolta colorimeter was set at 53 mm instead of 18 mm. --.
Line 64, delete "flouorocherical" and insert in place thereof -- fluorochemical --.

Column 24,
Line 59, delete "formula (III)" and insert in place thereof -- formula (1I) --.

Column 25,
Line 1, after "wherein" insert -- : --.

Column 26,
Line 16, delete "to" and insert in place thereof -- or --.
Line 17, after "claim 5" insert -- , --.

UNITED STATES PATENT AND TRADEMARK OFFICE
CERTIFICATE OF CORRECTION

PATENT NO. : 6,485,789 B1
DATED : November 26, 2002
INVENTOR(S) : Allewaert, Kathy E. M. L. A.

It is certified that error appears in the above-identified patent and that said Letters Patent is hereby corrected as shown below:

Column 28,
Lines 5 , delete ":" and insert in place thereof -- ; --.
Line 60, delete "." and insert in place thereof -- , --.

Signed and Sealed this

Twenty-eighth Day of June, 2005

JON W. DUDAS
*Director of the United States Patent and Trademark Office*